Patented Apr. 6, 1943

2,315,734

UNITED STATES PATENT OFFICE 2,315,734

PROCESS OF TREATING WATER

Anderson W. Ralston and William O. Pool, Chicago, Ill., assignors to Armour and Company, Chicago, Ill., a corporation of Illinois No Drawing. Application September 2, 1938, Serial No. 228,257

3 Claims. (Cl. 210—23)

This invention pertains to water treatment for the removal of unfilterable turbidity therefrom and it comprises processes wherein turbid water is treated with small amounts of aliphatic amines or amine salts of the general formula

where R is an aliphatic hydrocarbon radical containing at least six carbon atoms and R' is hydrogen or an alkyl radical and either allowed to settle or filtered in order to remove suspended materials therefrom.

The treatment of water for the removal of turbidity is a problem of great commercial and technical importance. In most cases the treatment consists in either allowing the sediment to settle or in filtering the water through sand filters. The former of these treatments is sometimes costly because of the large storage volumes required where large quantities of water are consumed. The latter treatment is effective in a number of cases especially when the particles causing the turbidity can be removed by filtration. A number of waters contain particles so small in size that they do not settle by gravity nor can they be removed by repeated filtration. These waters have a decidedly cloudy appearance and their treatment both for industrial and consumer purposes presents a sizable problem. Where waters contain suspended matter which cannot be removed by settling or filtration they are often treated with soluble inorganic salts which hydrolyze to give flocculent hydroxides. These gelatinous, flocculent hydroxides remove the suspended particles from the water during the process of settling. The most commonly used salts for this purpose are salts of aluminum or iron. None of the methods now used for the clarification of turbid water are entirely satisfactory.

We have now discovered that when water contains suspended particles not capable of being removed by gravity settling or by the ordinary means of filtration these waters can be clarified by the addition to the water of a small amount of an aliphatic amine or amine salt such amine having the general formula RNHR' where R is an aliphatic hydrocarbon radical containing at least six carbon atoms and R' is hydrogen or an alkyl radical. Upon adding the amine or amine salt to the suspension the suspended particles immediately flock so that they can either be removed by gravity settling or filtration.

The following examples can be given as illustrating the treatment of muddy or turbid waters by this process:

Example 1

A sample of Missouri River water was allowed to settle for twelve hours and then filtered three times through a fine mesh filter paper (Carl Schleicher and Schüll No. 597). The sample was still turbid and opaque. Samples of this water were then treated with varying concentrations of n-dodecyl amine hydrochloride and then filtered into twelve-inch Nessler tubes for observation. The results of these observations are as follows:

| Tube No. | Conc. of n-dodecyl amine HCl | Turbidity |
|---|---|---|
| | Parts per million | |
| 1 | 3 | Fairly clear. |
| 2 | 8 | Clear. |
| 3 | 16 | Very clear. |
| 4 | 32 | Fairly clear. |
| 5 | 64 | Cloudy. |
| 6 | 0 | Very turbid. |

The water contained in Tube No. 3 had a clarity corresponding to that of distilled water. Chemical examination of the water showed no amine or amine salts to be present. A comparison was made using sodium aluminate and a concentration of 500 parts per million was required to produce a corresponding clarity in this sample.

Example 2

A sample of hot tap water was repeatedly filtered through filter papers until no further clarity could be obtained by filtration. The sample is still quite turbid. It is then treated with sufficient dioctyl amine hydrochloride so that the concentration is 77 parts per million. This produced upon filtration a water comparable in clarity with distilled water when observed through twelve-inch Nessler tubes.

Example 3

A sample of the water described under Example 2 was treated with 40 parts per million of methyl octadecyl amine hydrochloride. This produced upon filtration a sample comparable in clarity to distilled water.

Example 4

A sample of the water described in Example 2 was treated with an alcoholic solution of decyl amine so that the concentration of decyl amine was 20 parts per million. This produced upon filtration a sample comparable in clarity with distilled water.

In explanation of the remarkable ability of amines or amine salts to remove turbidity from water we are of the opinion that the amine is specifically adsorbed by the suspended particles causing them to flock together and thus destroying those characteristics which tend to keep them permanently in suspension, such as electrical charges or high ratio of surface exposed to the mass of the particle. It will be noticed that only very small amounts of the amines or their salts are required to clarify the water. All of the amine is adsorbed upon the particle surfaces as evidenced by the fact that when no excess of amine over that required for clarification is added no amine or amine salts can be detected in the water. We have found this treatment to be essentially independent of the pH of the waters treated over the pH range usually encountered in waters used for industrial or drinking purposes.

While we have limited our examples to the use of only a few amines or amine salts, all aliphatic amines are operative where at least one of the alkyl groups therein contains six or more carbon atoms. Thus, such amines as methyl decyl amine, ethyl octyl amine, nonyl amine, dinonyl amine, methyl hexadecyl amine or their salts, such as the hydrochlorides or acetates, are operative.

Having thus described our invention, what we claim is:

1. The process of treating turbid water for the removal of unfilterable turbidity therefrom which includes adding to the water a small amount, not to exceed five hundred parts per million, of an amino compound chosen from the group consisting of aliphatic primary and secondary amines having at least six carbon atoms in an alkyl group thereof, and water soluble salts of said amines, to cause the turbidity-forming particles in the water to flock together so that they can be separated mechanically from the treated water, and then separating the flocked particles and amino compound associated therewith from the water to give a water freed of such unfilterable turbidity and free of said amino compound.

2. The process as in claim 1 wherein the compound added is chosen from the group consisting of dodecyl amine and water-soluble salts thereof.

3. The process as in claim 1 wherein the compound added is chosen from the group consisting of dioctyl amine and water-soluble salts thereof.

ANDERSON W. RALSTON.
WILLIAM O. POOL.